(12) United States Patent
Beau et al.

(10) Patent No.: US 10,858,189 B2
(45) Date of Patent: Dec. 8, 2020

(54) DEVICE FOR SUPPLY AND POSITIONING OF STRAWS FOR PACKAGING ANIMAL SEMEN AND PROCESSING INSTALLATION COMPRISING SUCH A DEVICE

(71) Applicant: IMV TECHNOLOGIES, Saint Ouen sur Iton (FR)

(72) Inventors: Christian Beau, Toussus le Noble (FR); Ludovic LeFranc, Les Aspres (FR)

(73) Assignee: IMV TECHNOLOGIES, Saint Ouen sur Iton (FR)

( * ) Notice: Subject to any disclaimer, the term of this patent is extended or adjusted under 35 U.S.C. 154(b) by 307 days.

(21) Appl. No.: 15/776,476

(22) PCT Filed: Nov. 15, 2016

(86) PCT No.: PCT/FR2016/052960
§ 371 (c)(1),
(2) Date: May 16, 2018

(87) PCT Pub. No.: WO2017/085395
PCT Pub. Date: May 26, 2017

(65) Prior Publication Data
US 2018/0346248 A1    Dec. 6, 2018

(30) Foreign Application Priority Data
Nov. 19, 2015  (FR) ...................... 15 61121

(51) Int. Cl.
*B65G 15/30*  (2006.01)
*A61D 19/02*  (2006.01)
(Continued)

(52) U.S. Cl.
CPC ........... *B65G 15/30* (2013.01); *A61D 19/024* (2013.01); *B65B 3/003* (2013.01); *B65B 51/10* (2013.01); *B65G 2201/0235* (2013.01)

(58) Field of Classification Search
CPC ........... B65B 3/003; B65B 3/06; B65B 51/10; B65B 35/06; B65B 35/12; B65B 35/32;
(Continued)

(56) References Cited

U.S. PATENT DOCUMENTS 3,307,723 A * 3/1967 Walker ............... B65G 47/1407
414/414
3,593,761 A * 7/1971 Lorenz ................. A61D 19/024
141/155

(Continued)

FOREIGN PATENT DOCUMENTS

| EP | 1125870 A1 | 8/2001 |
|---|---|---|
| FR | 2905592 A1 | 3/2008 |

*Primary Examiner* — Thomas M Wittenschlaeger
(74) *Attorney, Agent, or Firm* — Browdy and Neimark, P.L.L.C.

(57) ABSTRACT

The invention relates to a feeding and positioning device (5) for straws (2) for packing animal semen on a support (4), with a feeding hopper (20) having an inner space (21) which receives the straws and is partially delimited by an inclined and electrically conductive bottom wall (38), an evacuation chute (22) with an inlet orifice, which opens into said inner space, and with an outlet orifice opposite said support, a disentangling system (25) having an electrically conductive and movable part configured to come into contact with said straws and to set them in motion in said inner space, an electrically conductive support, and a mechanical connection interface of said movable part on said support, and electrical connection elements which are directly connected, respectively, to said bottom wall and said support and to said movable part and said support.

17 Claims, 6 Drawing Sheets

(51) Int. Cl.
*B65B 3/00* (2006.01)
*B65B 51/10* (2006.01)

(58) Field of Classification Search
CPC ....... B65B 37/02; B65B 39/007; B65G 15/30; B65G 2201/0235; A61D 19/024; B65D 88/28
See application file for complete search history.

(56) References Cited

U.S. PATENT DOCUMENTS

| | | | | |
|---|---|---|---|---|
| 3,880,210 | A * | 4/1975 | Randolph | A61D 19/024 141/175 |
| 4,004,739 | A * | 1/1977 | Cramer | B02C 25/00 241/34 |
| 4,063,633 | A * | 12/1977 | Hall | A24O 5/325 198/455 |
| 4,327,825 | A * | 5/1982 | Ackley, Sr. | B65B 47/1471 198/380 |
| 4,401,237 | A * | 8/1983 | Smith | G01F 23/24 222/56 |
| 4,409,046 | A * | 10/1983 | Holzwarth | A61M 5/32 156/73.6 |
| 4,478,261 | A * | 10/1984 | Cassou | B65B 3/003 141/173 |
| 4,669,633 | A * | 6/1987 | Tennent | B65G 59/062 221/175 |
| 4,860,922 | A * | 8/1989 | Malservisi | G07F 11/44 221/6 |
| 5,160,940 | A * | 11/1992 | Cassou | B65G 47/1407 347/4 |
| 5,735,383 | A * | 4/1998 | Abbate | B24B 19/16 198/429 |
| 5,960,990 | A * | 10/1999 | Radosevich | B65D 88/66 222/1 |
| 6,212,860 | B1 * | 4/2001 | Preisner | B65B 9/067 53/131.4 |
| 6,527,147 | B2 * | 3/2003 | Wehrmann | B65B 37/08 222/185.1 |
| 6,604,673 | B1 * | 8/2003 | Bourrieres | B23K 3/0607 228/246 |
| 6,732,486 | B2 * | 5/2004 | Saint-Ramon | B65G 47/1407 53/131.4 |
| 7,047,709 | B2 * | 5/2006 | Hamilton | B65B 3/16 53/250 |
| 7,257,935 | B1 * | 8/2007 | Wehrmann | B65B 37/08 53/139.5 |
| 7,415,815 | B2 * | 8/2008 | Vodonos | G07F 11/44 221/304 |
| 7,946,097 | B2 * | 5/2011 | Gnann | B65B 59/001 53/246 |
| 8,925,289 | B2 * | 1/2015 | Lecointe | B29O 66/43121 53/282 |
| 2001/0008076 | A1 * | 7/2001 | Alexander | C03B 3/023 65/27 |
| 2006/0011084 | A1 * | 1/2006 | Perkins | F42D 1/10 102/313 |
| 2007/0125675 | A1 | 6/2007 | Booker et al. | |
| 2007/0212997 | A1 * | 9/2007 | Kurosawa | G07D 9/008 453/49 |
| 2017/0029224 | A1 * | 2/2017 | Shimazu | B65G 65/4881 |

* cited by examiner

DEVICE FOR SUPPLY AND POSITIONING OF STRAWS FOR PACKAGING ANIMAL SEMEN AND PROCESSING INSTALLATION COMPRISING SUCH A DEVICE

FIELD OF THE INVENTION

The invention generally relates to the preservation of a liquid-based substance containing biological material, in particular animal semen, in packaging straws filled with a predetermined dose of such a substance.

More particularly, the invention concerns a device for supply and positioning of such straws, on a movable support of a processing installation for those straws, for a step of processing those straws, for example printing, filling and/or welding, and a processing installation comprising a processing machine for straws, such a movable support and such a supply and positioning device.

TECHNOLOGICAL BACKGROUND

Straws for packaging animal semen are conventionally formed by a thin tube of plastic material and by a stopper engaged in the thin tube. This stopper is formed by two plugs of fibrous substance which enclose a powder which transforms on contact with a liquid, into an impermeable gel or paste adhering to an inside wall of the tube, in order for the stopper to be fluid-tight.

Treatment installations and in particular those for filling and welding straws are known, which comprise a filling and welding machine configured to fill and weld straws, a movable support configured to receive the straws and convey them to the filling and welding machine, and a device for supply and positioning of the straws on the movable support.

Such an installation is for example described in European patent application EP 1 125 870.

The filling and welding machine conventionally comprises a vacuum pump and filling needles mounted on a carriage, which are configured to cooperate with the straws and to enable their filling.

The filling and welding machine further comprises a welding station configured to weld the ends of the straws after filling.

The movable support is generally formed by conveyor belts each having a plurality of grooves forming accommodations configured to receive the straws in a predetermined orientation.

The movable support is configured to convey the straws so accommodated thereon, from the supply and positioning device to the filling needles of the filling and welding machine for the filling of the straws, then from the filling needles to the welding station for the welding of the straws.

The supply and positioning device comprises a fixed supply hopper mounted on a frame of the installation and configured to receive a plurality of straws.

The supply hopper is provided with an inclined ramp and with a vertical channel, and the supply and positioning device further comprises a roller for separating the straws and a palette allowing the passage of the straws from the inclined ramp to the vertical channel; for the loading of these straws, three by three, into the grooves of the conveyor belts which provide the conveying of the straws towards the filling and welding machine.

SUBJECT OF THE INVENTION

The invention is directed to providing a device for supply and positioning of straws on a movable support, equipping a processing installation for such straws, of a kind similar to that described above, and which is more convenient and provides better performance.

To that end, according to a first aspect, the invention provides a device for supply and positioning of straws for packaging a predetermined dose of liquid-based substance, in particular animal semen, on a movable support for a step of processing said straws, said supply and positioning device and movable support being configured to equip a processing installation for said straws provided with a processing machine for implementing said step of processing said straws, said supply and positioning device comprising a supply hopper having an internal space configured to receive a plurality of straws, an evacuation channel comprising an entry aperture opening into said internal space of said supply hopper and an exit aperture configured to be opposite said movable support, a separator system comprising a movable part configured to enter into contact with said straws and impart movement to them in said internal space of said supply hopper; said supply and positioning device being characterized in that said supply hopper comprises an inclined bottom wall formed at least partly from electrically conducting material and which delimits at least partly said internal space, said separator system further comprises a mounting and a mechanical connection interface configured to mechanically fasten said movable part to said mounting, said movable part and said mounting being formed at least partly from electrically conducting material, and said supply and positioning device further comprises a first electrical connection member directly connected both to said inclined bottom wall of said supply hopper and to said mounting of said separator system, as well as a second electrical connection member directly connected both to said movable part and to said mounting of said separator system, said second electrical connection member being distinct from said mechanical connection interface of said separator system.

The device according to the invention makes it possible to electrically connect together each of the inclined bottom wall of the supply hopper, the movable part of the separator system and the mounting of the separator system, via the first and second electrical connection members. This makes it possible to establish an equipotential connection between these electrically connected parts.

Because the straws are formed by a thin tube of plastic material, and because they are in sliding contact with the inclined bottom wall, and are also in contact with the movable part of the separator system which stirs them, static electricity is liable to be generated in particular at the location of the inclined bottom wall and the movable part of the separator system.

On account of the electrical conduction properties of the inclined bottom wall and of the movable part of the separator system, and on account of the equipotential connection established by the device according to the invention, the latter makes it possible to evacuate the static electricity generated in particular at the location of the inclined bottom wall and the movable part of the separator system.

Therefore, by virtue of the device according to the invention, the straws are not subject to the risk of becoming electrostatically charged to the extent of not entering into the evacuation channel. Thus, the supply and evacuation of the straws onto the movable support are facilitated.

What is more, it will be noted that the supply and positioning device, and in particular the separator mounting, is preferably mounted on a frame of the processing installation which the device equips. This frame may be connected to a more general equipotential connection, for example what is referred to as an earth or ground connection, such that the inclined bottom wall of the supply hopper, the movable part of the separator system, the separator system mounting and the first and second electrical connection members are interconnected to that more general equipotential connection.

According to preferred, simple, convenient and economical features of the device according to the invention:

said first electrical connection member is formed by a metal strip having a first end portion fixedly attached to said mounting of said separator system, a second end portion elastically biased against said inclined bottom wall of said supply hopper, and a junction portion connecting said first and second end portions;

said movable part of said separator system comprises a rotational drive shaft and at least one separating finger mounted on said drive shaft and rotationally driven by the latter, and said inclined wall of said supply hopper is provided with at least one notch from which projects said separating finger into said internal space;

said second end portion of said first electrical connection member is configured to come into contact with a lower surface of said inclined bottom wall;

said device is configured such that said first electrical connection member extends at least partly around said drive shaft of said movable part of said separator system, said first and second end portions of said first electrical connection member extending at least partly opposite each other and said drive shaft being interposed between said first and second end portions;

said separator system further comprises an electric motor mounted on said mounting of said separator system and configured to rotationally drive said drive shaft of said movable part; and said movable part further comprises at least one bearing mounted on said mounting of said separator system and configured to bear said drive shaft;

said second electrical connection member is configured to be in continuous sliding contact with said drive shaft of said movable part of said separator system;

said second electrical connection member comprises a metal barrel inserted into a well provided in said mounting of said separator system, an elastic metal return member inserted into said barrel, as well as an electrically conducting consumable member interposed between said drive shaft and said elastic return member and in continuous contact with these latter;

said supply hopper further comprises two lateral walls opposite each other, a rear wall meeting the two said lateral walls, a front wall opposite said rear wall and also meeting the two said lateral walls, said inclined bottom wall being connected to said lateral walls and rear wall, said internal space also being delimited at least partly by said lateral walls, rear wall and front wall, and said evacuation channel being formed in line with said front wall, at one end of said inclined bottom wall;

said supply hopper further comprises at least one rib provided on said inclined bottom wall, projecting into said internal space;

said supply hopper is removable and has positioning feet, and said supply and positioning device further comprises a hopper mounting formed by a plurality of reception pillars configured to cooperate with said positioning studs;

said supply hopper is provided with a movable obturating system of said evacuation channel, disposed under said inclined bottom wall, and having an obturating position in which it is configured to obturate at least partly said exit aperture of said evacuation channel when said supply hopper is not positioned on said hopper mounting; so as to prevent the evacuation of said straws; and/or said device further comprises a mechanism configured to pass said movable obturating system from its obturating position to an evacuation position in which it is configured to be at a distance from said exit aperture of said evacuation channel, when said supply hopper is positioned on said hopper mounting; so as to authorize the evacuation of said straws.

According to a second aspect, the invention is also directed to a processing installation for straws for packaging a predetermined dose of liquid-based substance, in particular animal semen, comprising a processing machine for said straws, a movable support configured to convey said straws to said processing machine, as well as a device for supply and positioning of said straws on said movable support, as described above, which supply and positioning device being mounted on a frame of said installation.

According to features that are preferred, simple, convenient and economical of the installation according to the invention, said processing machine is a machine for filling and welding said straws, comprising a pump mechanism associated with filling needles mounted on a carriage, which are configured to cooperate with the straws and to ensure their filling, a welding station configured to weld ends of said straws after filling, and said movable support is formed by conveyor belts each having a plurality of grooves forming accommodations configured to receive said straws in a predetermined orientation when said accommodations are situated opposite the exit aperture of the evacuation channel of said supply and positioning device.

BRIEF DESCRIPTION OF THE DRAWINGS

The disclosure of the invention will now be continued with the detailed description of embodiments, given below by way of non-limiting illustration, with reference to the appended drawings. In these.

DETAILED DESCRIPTION OF EMBODIMENTS

Figure 1:
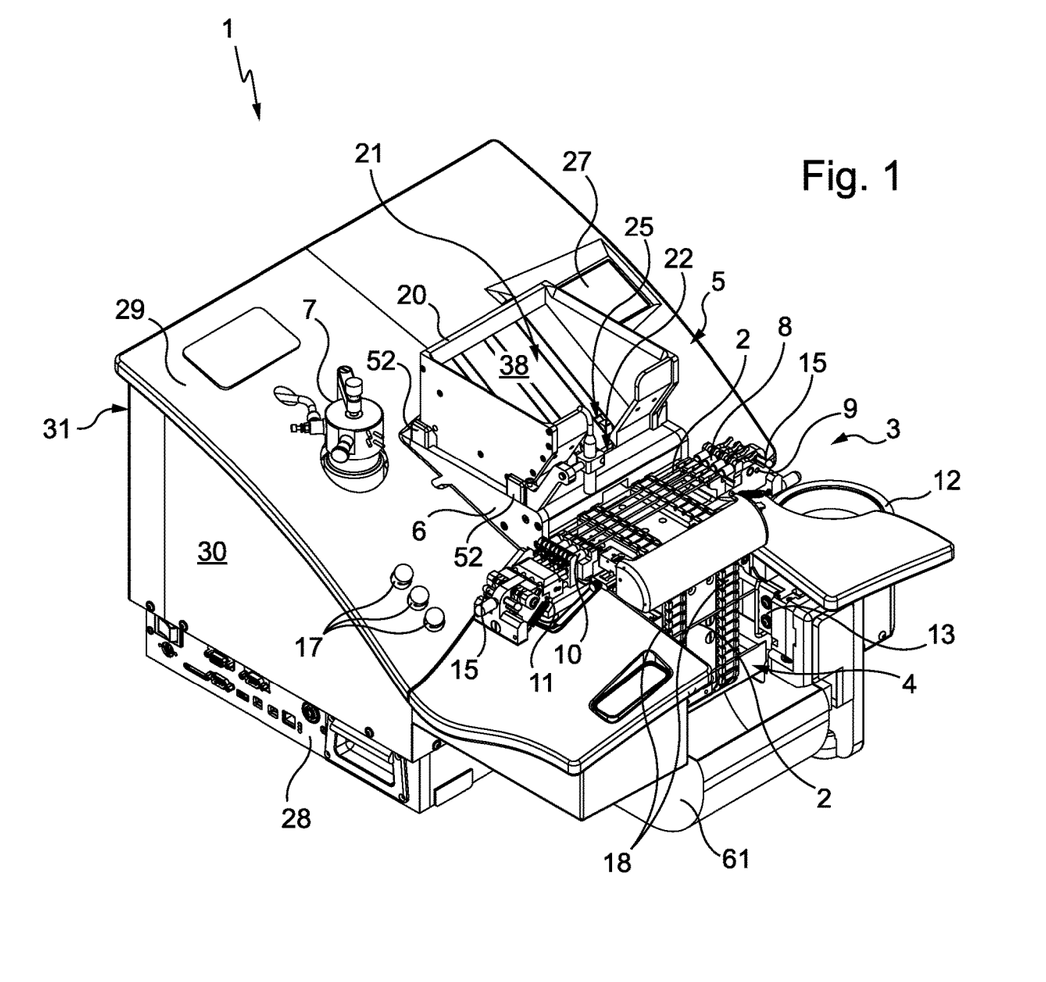
FIG. 1 is a diagrammatic illustration in perspective of a processing installation, in particular for filling and welding, of straws for packaging animal semen, comprising a device for supply and positioning, a movable support and a processing machine.

FIG. 1 illustrates an installation 1 for treatment of straws 2 for packaging a predetermined dose of liquid-based substance, here animal semen.

The processing installation 1 here is an installation for the filling and the welding of the straws 2, and comprises a processing machine 3, here a machine for filling and welding straws 2, a movable support 4 configured to convey the straws 2 to the filling and welding machine 3, as well as a device 5 for supply and positioning of straws 2 on the movable support 4 for the purpose of the filling and welding of the straws 2.

The processing machine 3, the movable support 4 and the supply and positioning device 5 are mounted on a frame 6 of the installation 1.

The straws 2 for packaging animal semen extend generally longitudinally and are formed by a thin tube of plastic material having two free ends and by a stopper engaged in the thin tube (not shown). This stopper is formed by two plugs of fibrous substance which enclose a powder which transforms on contact with a liquid, into an impermeable gel or paste adhering to an inside wall of the tube, in order for the stopper to be fluid-tight.

The filling and welding machine 3 comprises a pump mechanism 7, provided in particular with a vacuum pump, filling nozzles 8 mounted on a first movable carriage 9, suction nozzles 10 mounted on a second movable carriage 11 which is disposed opposite the first movable carriage 9, and with a reservoir of animal semen 12.

The filling nozzles 8 and the suction nozzles 10 are configured to cooperate with the straws 2 and to enable their filling.

The filling nozzles 8 and the suction nozzles 10 are mounted on the first and second movable carriages 9 and 11 to be movable parallel to the length of the straws 2 between an advanced filling position and a withdrawn position.

The filling and welding machine 3 further comprises a welding station 13 configured to weld the ends of the straws 2 after filling.

More specifically, FIG. 1 shows the straws 2 in course of cooperation with filling nozzles 8 and suction nozzles 10.

Before filling, the stopper of each straw 2 is disposed in the neighborhood of a first of the ends of the tube of the straw 2 and it is provided that in the filled state, the dose of animal semen which must be preserved in the straw 2 is disposed between the stopper and a second of the ends of the tube which is the furthest from the stopper.

To fill each straw 2, the first end of the tube is placed in communication by virtue of the suction nozzle 10 with the pump mechanism 7 whereas the second end is placed in communication by virtue of the filling nozzle 8 with the reservoir 12 containing the semen to introduce into the tube of the straw 2.

The air initially contained between the stopper of the straw 2 and the second end is sucked through the stopper whereas the semen progresses within the tube of the straw 2 until it encounters its stopper.

The filling nozzle 8 comprises a needle 14 (visible in FIG. 4) connected to the reservoir 12 via a flexible pipe (not shown) connected to a connector tip of the filling nozzle 8.

The suction nozzle 10 comprises a needle 16 connected to the pump mechanism 7 via a flexible pipe (not shown) connected to a connector tip of the suction nozzle 10.

The filling and welding machine 3 further comprises pinch members 15 for pinching each of the flexible pipes enabling the fluidic communication to be interrupted or authorized between the needle 14 and the reservoir 12 and between the needle 16 and the pump mechanism 7.

It will be noted that the first and second movable carriages 9 and 11 are each provided with several filling nozzles 8 and suction nozzles 10 to enable the filling of several straws 2 at the same time.

The pinch members 15 are configured to interrupt or allow, at the same time, the fluidic communication of all the pipes connected to the filling nozzles 8 and suction nozzles 10.

The filling and welding machine 3 further comprises solenoid valves 17 configured to shunt at least one of the suction nozzles 10, by pinching the flexible pipe linking it to the pump mechanism 7.

Once the straws 2 are in the filled state, they are conveyed to the welding station 13 and are welded in the neighborhood of the second end of the tube, or even also in the neighborhood of the first end of the tube, then they are collected for cold storage.

The movable support 4 is formed by two conveyor belts 18 each having a plurality of grooves forming accommodations 19 (visible in particular in FIGS. 4 and 5) that are configured to receive the straws 2 in a predetermined orientation.

The movable support 4 is configured to convey the straws thus accommodated on the latter, from the supply and positioning device 5 to the filling and suction nozzles 8 and 10 for filling the straws 2, then from these nozzles to the welding station 13 for welding of the straws 2.

The supply and positioning device 5 comprises a supply hopper 20 having an internal space 21 configured to receive a plurality of straws 2, as well as an evacuation channel 22 comprising an entry aperture 23 (visible in FIGS. 2, 6 and 7) opening into the internal space 21 of the supply hopper 20 and an exit aperture 24 (visible in FIGS. 3, 6 and 7) configured to be opposite accommodations 19 of the movable support 4.

The supply and positioning device 5 here further comprises a separator system 25 configured to impart movement to the straws 2 in the internal space 21 of the supply hopper 20.

The insulation 1 further comprises a container 61 for collecting the straws 2 after filling and welding thereof, a control-command screen 27 connected to a control-command unit (not shown) of the installation 1, for the implementation in particular of the steps of filling and welding the straws 2, as well as a supply and connection block 28 having an interface provided with a plurality of ports for information technology and electrical connection which are connected in particular to the control-command unit.

The frame 6 of the installation 1 is at least partly covered with adorning panels, here formed in particular by a front panel 29, two lateral panels 30 (only one of which is visible in FIG. 1), and a rear panel 31.

Figure 2:
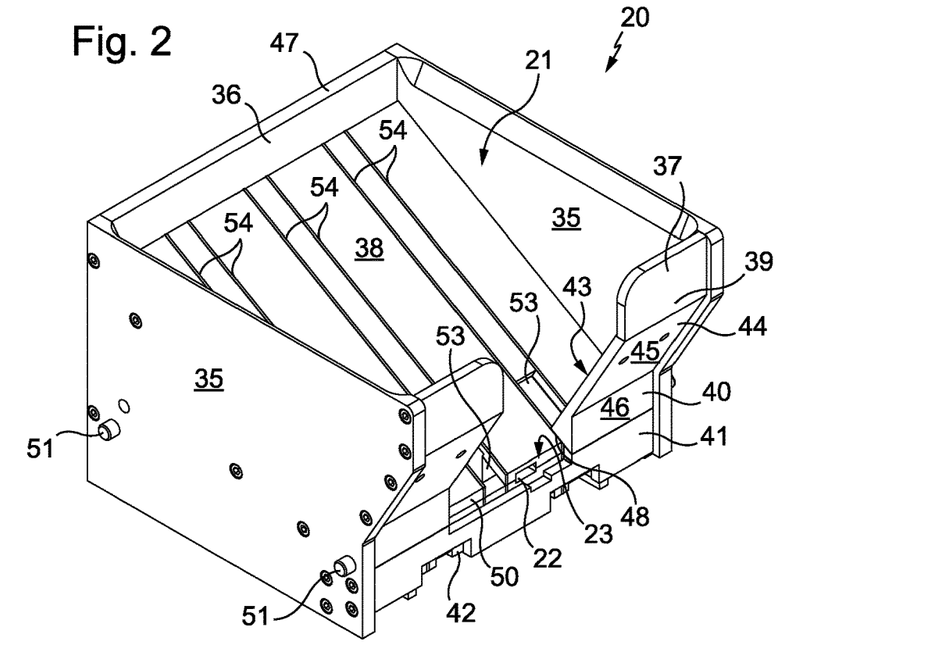
FIGS. 2 and 3 are perspective illustrations from two different viewing angles of the supply hopper of the supply and positioning device, taken in isolation.
Figure 3:
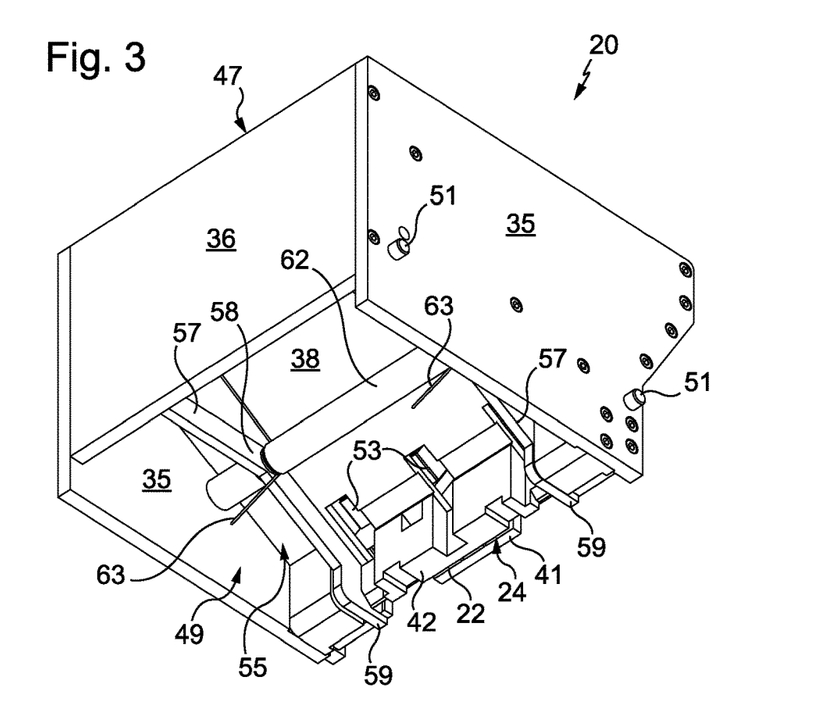

The supply hopper 20 will now be described in more detail with reference to FIGS. 2 and 3.

The supply hopper 20 comprises two lateral walls 35 opposite each other, a rear wall 36 meeting the two lateral walls 35, a front wall 37 opposite the rear wall 36 and also meeting the two lateral walls 35, as well as an inclined bottom wall 38 meeting each of the lateral walls 35 and rear wall 36.

The internal space 21 of the supply hopper 20 is delimited at least partly by each of the lateral walls 35, front wall 37, rear wall 36 and bottom wall 38.

The inclined bottom wall 38 is produced at least partly from electrically conducting material.

The lateral walls 35, the front wall 37 and the rear wall 36 are here also formed from electrically conducting material.

The supply hopper 20 further comprises a first flange 41 disposed consecutively to the front wall 37 as well as a second flange 42 disposed opposite the first flange 41 under the inclined bottom wall 38

The supply hopper 20 is removable and has positioning feet 51 provided projecting from each of the lateral walls 35.

The supply and positioning device 5 further comprises a hopper support formed by a plurality or reception pillars 52 (visible in FIGS. 1, 4 and 5) which are fastened to a U-shaped base 56 of the frame 6 of the installation and are configured to cooperate with the positioning feet 51 of the supply hopper 20; so as to position it in a predetermined position.

The lateral walls 35 and the rear wall 36 are substantially planar here; whereas the front wall 37 is provided with a first vertical portion 39 and with a second portion 40 extending from the first vertical portion 39 to the first flange 41.

The second portion 40 of the front wall 37 has an inclined inside face 43, oriented towards the internal space 21, and an outside face 44 having an inclined section 45 extending from the first vertical portion 39 and a vertical section 46 extending from the inclined section 45 to the first flange 41.

The inclined bottom wall 38 extends from the neighborhood of an upper edge 47 of the rear wall 36 to a free end 50 of that wall 38 disposed opposite a lower edge 48 of the front wall 37.

The free end 50 of the inclined bottom wall 38 is disposed above the second flange 42.

The evacuation channel 22 is formed in line with the front wall 37, extends between the first and second flanges 41 and 42, its entry aperture 23 being situated at the location of the free end 50 of the inclined bottom wall 38 and opening into the internal space 21, and its exit aperture 24 being situated away from its entry aperture 23 and provided to be opposite accommodations 19 of the movable support 4.

The supply hopper 20 further comprises several cut-outs 53 provided in the inclined bottom wall 38, open at the location of the free end 50 of the inclined bottom wall 38.

The supply hopper 20 further comprises several ribs 54 provided on the inclined bottom wall 38 and projecting from the internal space 21.

These ribs 54 extend over the whole of the inclined bottom wall 38, from the rear wall 36 to its free end 50, and pass beside the cut-outs 53 on either side thereof.

The inclined bottom wall 38, the lateral walls 35, the rear wall 36 and the front wall 37 are furthermore configured to provide a lower cavity 49 under the inclined bottom wall 38, situated on the other side to the inside space 21.

The supply hopper 20 is furthermore provided with a movable obturating system 55 of the evacuation channel 22, disposed under the inclined bottom wall 38 in the lower cavity 49.

This movable obturating system 55 has an obturating position in which it is configured to obturate at least partly the exit aperture 24 of the evacuation channel 22 when the supply hopper 20 is not positioned on the pillars 52 forming the hopper support; so as to prevent the evacuation of the straws 2.

The supply and positioning device 5 further comprises a mechanism configured to pass the movable obturating system 55 from its obturating position to an evacuation position in which it is configured to be at a distance from the exit aperture 24 of the evacuation channel 22, when the supply hopper 20 is positioned on the pillars 52 forming the hopper support; so as to enable the evacuation of the straws 2.

More specifically, the movable obturating system 55 comprises a bar 62 fastened onto each lateral wall 35 and two arms 57 hinged at an elbow 58 around the bar 62; each arm 57 being provided with a hook 59 at a first end situated at the location of the exit aperture 24 of the channel 22 to hinder the evacuation of the straws 2.

The movable obturating system 55 further comprises a spacing member 60 (visible in FIGS. 6 and 7) connecting the arms 57 by a second respective end, which is an opposite end to the first respective end.

The movable obturating system 55 further comprises two return springs 63 disposed around the bar 62 and rotationally biasing the arms 57 to place the movable obturating system 55 in its obturating position.

Figure 6:
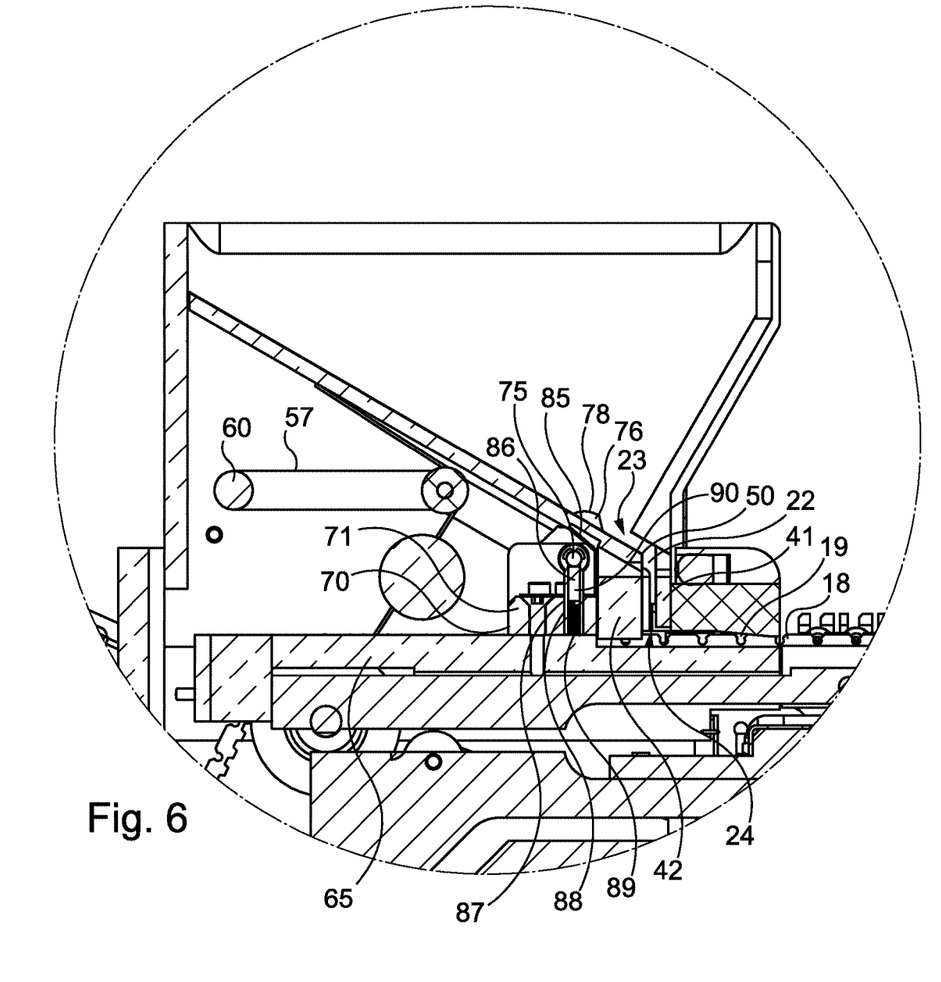
FIGS. 6 and 7 are cross-section views on VI-VI and VII-VII of FIG. 5, showing in particular the supply and positioning device.
Figure 7:
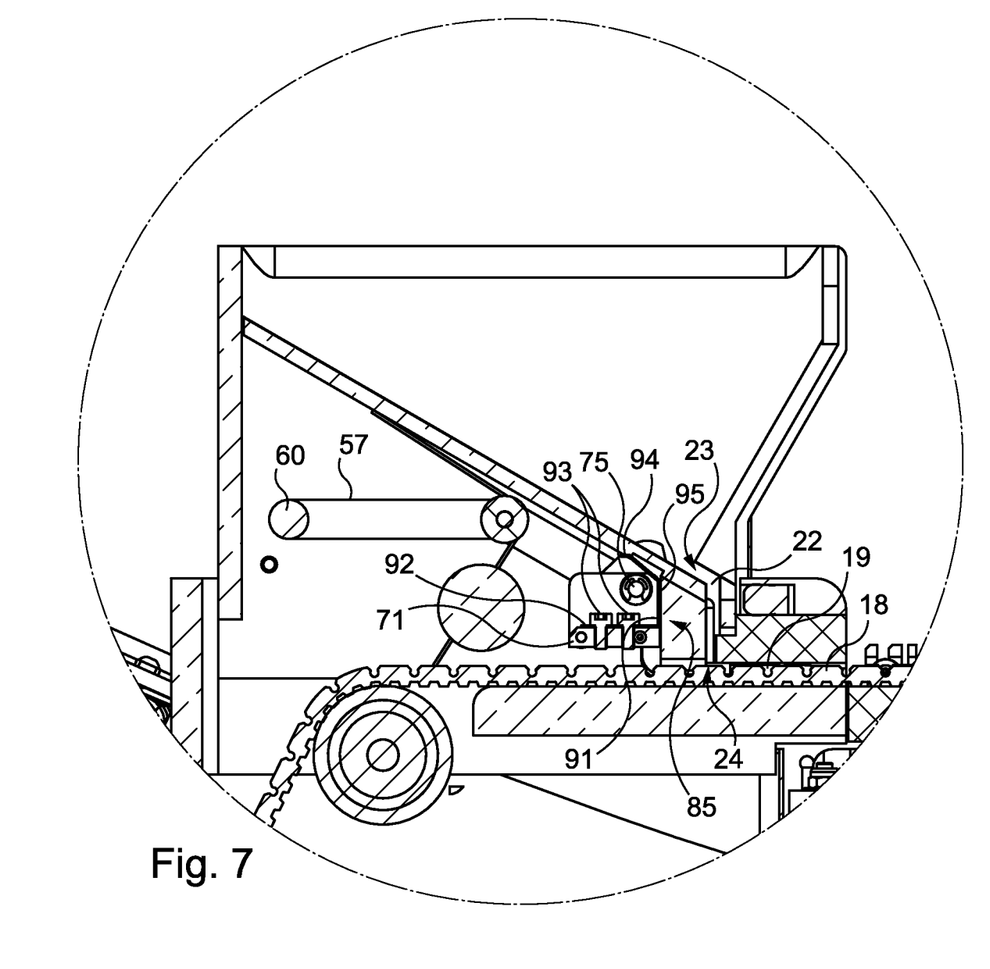

The supply and positioning device 5 further comprises a pusher 64 mounted on a T-shaped base 65 of the frame 6 of the installation 1 and which is configured to come to bear on and bias the spacing member 60 and thus the arms 57 against the return springs 63; to pass the movable obturating system from its obturating position to its evacuation position.

It will be noted that the pusher 64, the spacing member 60 and the bar 62 here form the mechanism configured to pass the movable obturating system 55 from its obturating position to its evacuation position.

Figure 4:
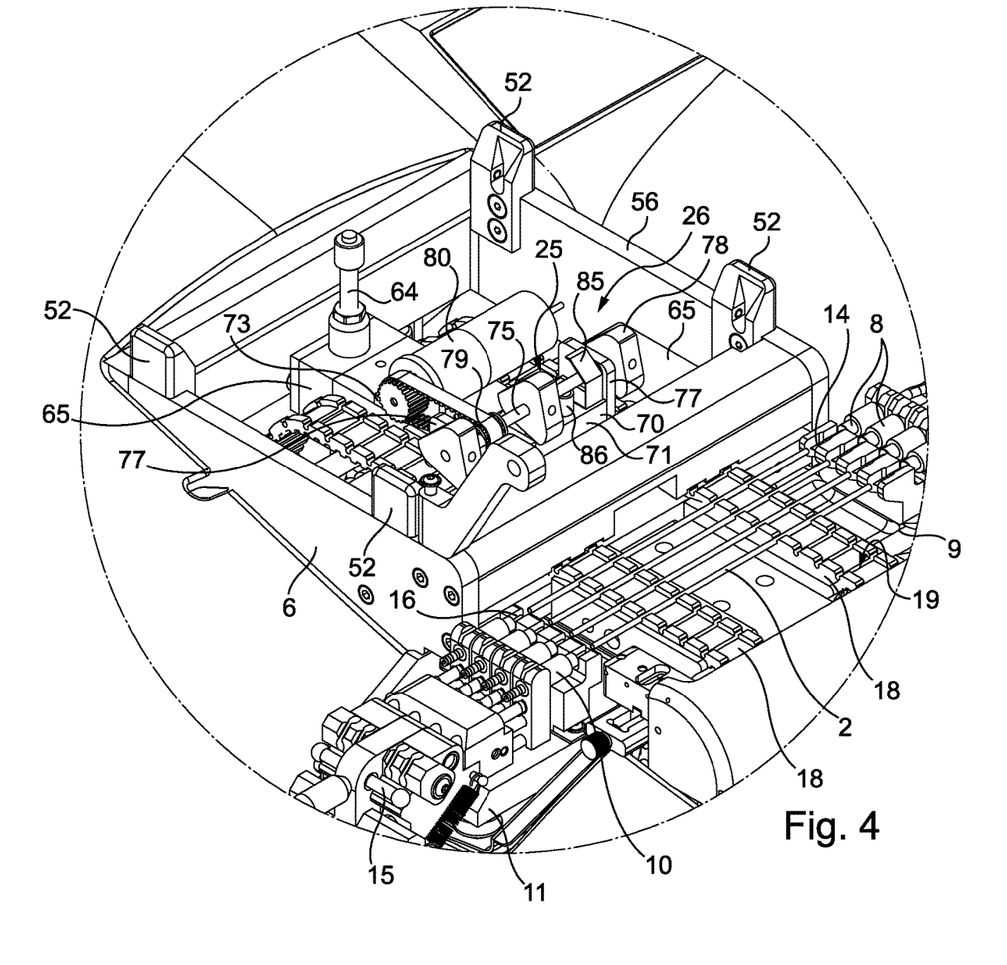
FIG. 4 illustrates an enlargement in perspective of part of the installation of FIG. 1, which part has no supply hopper of the supply and positioning device.
Figure 5:
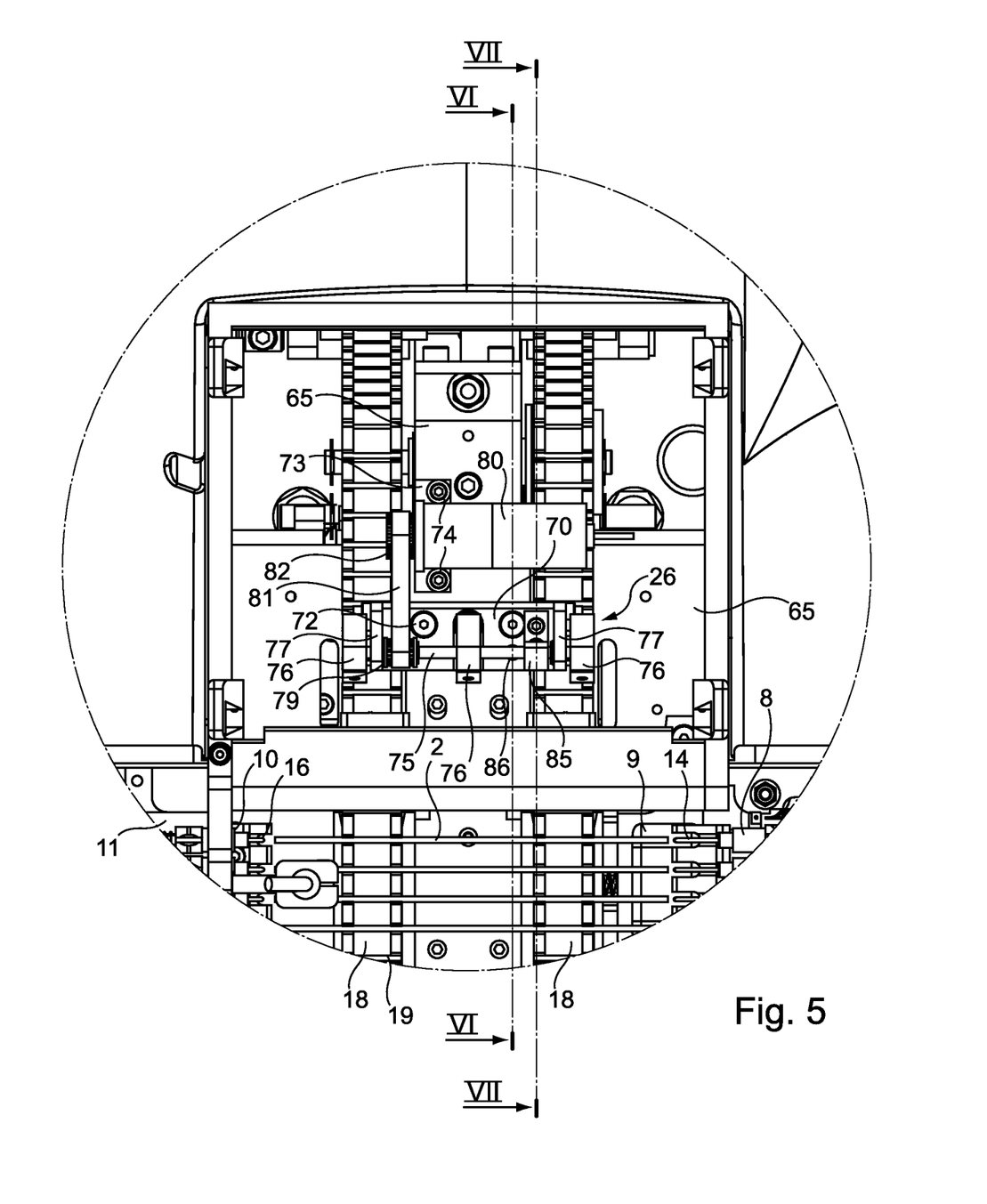
FIG. 5 illustrates from above the enlargement visible in FIG. 4.

The separator system 25 will now be described in more detail with reference to FIGS. 4 and 5.

The separating system 25 is provided with a movable part 26 configured to enter into contact with the straws 2 and impart movement to them.

The separating system 25 comprises a separator mounting 70 and a mechanical connection interface configured to mechanically fasten the movable part 26 to the separator mounting 70.

The movable part 26 and the separator mounting 70 are made from electrically conducting material.

The separator mounting 70 comprises a first block 71 fastened using screws 72 onto the T-shaped base 65 of the frame 6 of the installation 1; as well as a second block 73, distinct from the first block 71, and fastened using screws 74 also on the T-shaped base 65.

The movable part 26 is mounted on the first block 71 and comprises a rotational drive shaft 75 and several separating fingers 76 mounted on the drive shaft 75 and rotationally driven by the latter.

The separating system 25 further comprises two bearing 77 each disposed between two separating fingers 76, fastened on either side of the first block 71 and configured to bear the rotational drive shaft 75.

These bearings 77 form the mechanical connection which mechanically fastens the movable part 26 to the separator mounting 70.

The separating fingers 76 each have a triangular shape with three rounded vertices 78 configured to project into the internal space 21 of the supply hopper 20, through a respective notch 53 formed in the inclined bottom wall 38 of the hopper 20.

The movable part 26 further comprises a first drive cog 79 attachedly mounted on the rotational drive shaft 75.

The separating system 25 further comprises an electric motor 80 mounted on the second block 73 of the separator mounting 70 and provided with a second drive cog 82 configured to rotationally drive the rotational drive shaft 75 of the movable part 26 via a transmission belt 81.

The supply and positioning device 5 further comprises a first electrical connection member 85 directly connected both to the inclined bottom wall 38 of the supply hopper 20 and to the separator mounting 70; as well as a second electrical connection member 86 directly connected both to the movable part 26 and to the separator mounting 70.

As detailed below, the second electrical connection member 86 is distinct from the bearings 77 of the separator system 70 and is configured to be in continuous sliding contact with the drive shaft 75 of the movable part 26 of the separator system 25.

More specifically, the second electrical connection member 86 comprises a metal barrel 87 inserted into a hollow 88 provided in the first block 71 of the separator mounting 70; a metal elastic return member 89, such as a spring, is inserted into the shank 87, as well as an electrically conducting consumable member 90, such as a carbon brush, interposed between the drive shaft 75 and the elastic return member 89 and in continuous contact with these latter.

The first electrical connection member 85 is formed by a metal strip 91 having a first end portion 92 fixedly attached to the first block 71 of the separator mounting 70 via fastening screws 93; a second end portion 94 elastically biased against the inclined bottom wall 38 of the supply hopper 20 and configured to come into contact with a lower surface of that inclined bottom wall 38; and a junction portion 95 connecting the first and second end portions 92 and 94.

The metal strip 91 here extends at least partly around the drive shaft 75 of the movable part 26 of the separator system 25, the first and second end portions 92 and 94 of that strip 91 extending at least partly opposite each other and the drive shaft 75 being interposed between the first and second end portions 92 and 94.

The supply and positioning device 5 thus makes it possible to electrically connect together each of the inclined bottom wall 38 of the supply hopper 20, the movable part 26 of the separator system 25 and the separator mounting 70, via the metal strip 91, the separating fingers 76, the shaft 75, the carbon brush 90, the spring 89 and the barrel 87; which makes it possible to establish an equipotential connection between these electrically connected members.

It will be noted that the first block 71 of the separator mounting 70 is also connected to the T-shaped base 65 of the frame 6 of the installation 1, which frame 6 may be electrically connected to a more general equipotential connection, for example what is referred to as a ground or earth connection.

In operation, the straws 2 are introduced into the internal space 21 of the supply hopper 20. The straws 2 slide on the ribs 54 of the inclined bottom wall 38, are stirred by the rounded vertices 78 of the separating fingers 76 at the location of the cut-outs 53, enter, in series one after the other, the vertical channel 22 by its entry aperture 23, and fall, in series one after the other, through the exit aperture 23, into a respective accommodation 19 on the conveyor belts 18 of the movable support 4.

Because the straws 2, are formed by a thin tube of plastic material, and because they are in sliding contact with the inclined bottom wall 38, and are also in contact with the movable part 26 of the separator system 25 which stirs them, static electricity is liable to be generated in particular at the location of the inclined bottom wall 38 and the movable part 26 of the separator system 25.

On account of the electrical conduction properties of the inclined bottom wall 38 and of the movable part 26 of the separator system, and on account of the equipotential connection established by the supply and positioning device 5, the latter makes it possible to evacuate the static electricity generated in particular at the location of inclined bottom wall 38 and the movable part 26 of the separator system 25.

Therefore, by virtue of this device 5, the straws 2 are not subject to the risk of becoming electrostatically charged to the extent of not entering into the evacuation channel 22. Thus, the supply and evacuation of the straws 2 onto the movable support 4 are facilitated.

In variants that are not illustrated:
- the inclined bottom wall extends from a lower edge of the rear wall such that it has no inside cavity and also has no movable obturating system as described above;
- the hopper has no rib on its inclined bottom wall or the ribs are replaced by pins distributed over that wall;
- the lateral walls and/or the rear wall and/or the front wall of the supply hopper are not produced from electrically conducting material;
- the evacuation channel is not vertical but inclined, is of uniform or variable inclination;
- the first and second flanges which delimit the evacuation channel are not fastened to the supply hopper but are instead mounted on the frame of the processing installation;
- the movable part of the separator system is not rotationally movable but instead movable in translation in a back-and-forth movement, and the second electrical connection member is not in sliding contact but bears directly on the movable part and is configured to follow the back-and-forth movement, for example by virtue of a spring;
- the first electrical connection member is not formed from a metal strip, but instead by a mechanism with a move finger actuated by a spring or a jack to extend the movable finger until it enters into contact with the bottom wall;
- the first end portion of the metal strip forming the first electrical connection member is elastic and bears against the first block of the separator mounting rather than being fastened to the latter;
- the second electrical connection member is not formed by an assembly of a carbon brush, barrel and spring, as described above, but is instead formed by a mechanism with a movable finger actuated by a spring or a jack to extend the movable finger until it enters into sliding contact with the rotational drive shaft;
- the second electrical connection member is not formed by an assembly of a carbon brush, barrel and spring, as described above, but is instead formed by a metal strip provided with a free end which elastically bears on and is in sliding contact with the rotational drive shaft of the separator system.
- the movable support is not formed by conveyor belts but rather by a rotary magazine provided with accommodations on its periphery, which are configured to receive the straws; and/or
- the processing machine is not a machine for filling and welding straws, but instead a machine configured only to fill or to weld the straws, or even a printing machine for straws.

Numerous other variants are possible according to circumstances, and in this connection it is to be noted that the invention is not limited to the examples described and shown.

The invention claimed is:

1. A device for supply and positioning of straws for packaging a predetermined dose of liquid-based substance on a movable support for a step of processing said straws, said supply and positioning device and movable support being configured to equip a processing installation for said straws provided with a processing machine for implementing said step of processing said straws, said supply and positioning device comprising a supply hopper having an internal space configured to receive a plurality of straws, an evacuation channel comprising an entry aperture opening into said internal space of said supply hopper and an exit aperture configured to be opposite said movable support, a separator system comprising a movable part configured to enter into contact with said straws and impart movement to them in said internal space of said supply hopper; said supply and positioning device being characterized in that said supply hopper comprises an inclined bottom wall formed at least partly from electrically conducting material and which delimits at least partly said internal space, said separator system further comprises a mounting and a mechanical connection interface connecting said movable part to said mounting, said movable part and said mounting being formed at least partly from electrically conducting material, and said supply and positioning device further comprises a first electrical connection member directly connected both to said inclined bottom wall of said supply hopper and to said mounting of said separator system, as well as a second electrical connection member directly connected both to said movable part and to said mounting of said separator system, said second electrical connection member being distinct from said mechanical connection interface of said separator system.

2. A device according to claim 1, characterized in that said first electrical connection member is formed by a metal strip having a first end portion fixedly attached to said mounting of said separator system, a second end portion elastically biased against said inclined bottom wall of said supply hopper, and a junction portion connecting said first and second end portions.

3. A device according to claim 2, characterized in that said second end portion of said first electrical connection member is configured to come into contact with a lower surface of said inclined bottom wall.

4. A device according to claim 2, characterized in that said supply and positioning device is configured such that said first electrical connection member extends at least partly around a drive shaft of said movable part of said separator system, said first and second end portions of said first electrical connection member extending at least partly opposite each other and said drive shaft being interposed between said first and second end portions.

5. A device according to claim 1, characterized in that said movable part of said separator system comprises a rotational drive shaft and at least one separating finger mounted on said drive shaft and rotationally driven by said drive shaft, and said inclined wall of said supply hopper is provided with at least one notch from which projects said separating finger into said internal space.

6. A device according to claim 5, characterized in that said separator system further comprises an electric motor mounted on said mounting of said separator system, and configured to rotationally drive said drive shaft of said movable part; and said movable part further comprises at least one bearing mounted on said mounting of said separator system and configured to bear said drive shaft.

7. A device according to claim 5, characterized in that said second electrical connection member is configured to be in continuous sliding contact with said drive shaft of said movable part of said separator system.

8. A device according to claim 7, characterized in that said second electrical connection member comprises a metal barrel inserted into a well provided in said mounting of said separator system, an elastic metal return member inserted into said barrel, as well as an electrically conducting consumable member interposed between said drive shaft and said elastic return member and in continuous contact with said drive shaft and said elastic return member.

9. A device according to claim 1, characterized in that said supply hopper further comprises two lateral walls opposite each other, a rear wall meeting the two said lateral walls, a front wall opposite said rear wall and also meeting the two said lateral walls, said inclined bottom wall being connected to said lateral walls and rear wall, said internal space also being delimited at least partly by said lateral walls, rear wall and front wall, and said evacuation channel being formed in line with said front wall, at one end of said inclined bottom wall.

10. A device according to claim 1, characterized in that said supply hopper further comprises at least one rib provided on said inclined bottom wall, projecting into said internal space.

11. A device according to claim 1, characterized in that said supply hopper is removable and has positioning feet, and said supply and positioning device further comprises a hopper mounting formed by a plurality of reception pillars configured to cooperate with said positioning studs feet.

12. A device according to claim 11, characterized in that said supply hopper is provided with a movable obturating system of said evacuation channel, disposed under said inclined bottom wall, and having an obturating position in which it is configured to obturate at least partly said exit aperture of said evacuation channel when said supply hopper is not positioned on said hopper mounting; so as to prevent the evacuation of said straws.

13. A device according to claim 12, characterized in that the device further comprises a mechanism configured to pass said movable obturating system from its obturating position to an evacuation position in which it is configured to be at a distance from said exit aperture said evacuation channel, when said supply hopper is positioned on said hopper mounting; so as to authorize the evacuation of said straws.

14. A device according to claim 1, wherein the liquid-based substance is animal semen.

15. A processing installation for straws for packaging a predetermined dose of liquid-based substance comprising a processing machine for said straws, a movable support configured to convey said straws to said processing machine, as well as a device for supply and positioning of said straws on said movable support, according to claim 1, which supply and positioning device is mounted on a frame of said installation.

16. An installation according to claim 15, characterized in that said processing machine is a machine for filling and welding said straws, comprising a pump mechanism associated with filling needles mounted on a carriage, which are configured to cooperate with the straws and to ensure their filling, a welding station configured to weld ends of said straws after filling, and said movable support is formed by conveyor belts each having a plurality of grooves forming accommodations configured to receive said straws in a predetermined orientation when said accommodations are situated opposite the exit aperture of the evacuation channel of said supply and positioning device.

17. An installation according to claim 15, wherein the liquid-based substance is animal semen.

* * * * *